(12) United States Patent
Lawrence et al.

(10) Patent No.: US 7,775,810 B2
(45) Date of Patent: Aug. 17, 2010

(54) VOLTAGE TAP APPARATUS FOR SERIES CONNECTED CONDUCTIVE CASE BATTERY CELLS

(75) Inventors: Robert A. Lawrence, Frankfort, IN (US); David L. Brown, Westfield, IN (US); Robert C. Beer, Noblesville, IN (US); Jerry J. Wendling, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 238 days.

(21) Appl. No.: 12/157,701

(22) Filed: Jun. 12, 2008

(65) Prior Publication Data

US 2009/0311891 A1    Dec. 17, 2009

(51) Int. Cl.
*H01R 25/00* (2006.01)
(52) U.S. Cl. .................. 439/121; 439/754; 429/93
(58) Field of Classification Search .............. 439/121, 439/500, 754; 429/99, 90–93, 100
See application file for complete search history.

(56) References Cited

U.S. PATENT DOCUMENTS 5,378,552 A * 1/1995 Dixon, Jr. ............... 429/91
6,240,637 B1 * 6/2001 Ikeda et al. ............. 29/854
6,498,406 B1 * 12/2002 Høriuchi et al. ......... 307/150
6,703,155 B2 * 3/2004 Scartozzi ................ 429/32
6,935,020 B2 * 8/2005 Ikeda .................... 29/854
7,572,547 B2 * 8/2009 Sakakibara ............. 429/120
2001/0018281 A1 * 8/2001 Royer .................... 439/100
2009/0087726 A1 * 4/2009 Shimoyama ............. 429/100
2009/0274948 A1 * 11/2009 Calderone ............... 429/50
2009/0274952 A1 * 11/2009 Wood et al. ............. 429/99
2009/0311891 A1 * 12/2009 Lawrence et al. ........ 439/121

* cited by examiner

*Primary Examiner*—Ross N Gushi
(74) *Attorney, Agent, or Firm*—Jimmy L. Funke

(57) ABSTRACT

A voltage tap apparatus functions as both a voltage tap and a cell isolator for conductive case battery cells that are joined end-to-end in a series chain. The apparatus includes conductive leadframe elements partially encased in a plastic frame that engages the joined cells about their juncture, with portions of the lead-frame elements exposed to electrically contact the conductive cases of the cells. In a first embodiment, the plastic frame is in the form of a hinged clamp that closes about the juncture of the cells, and the lead-frame elements are routed to terminals formed on one end of the frame. In a second embodiment, the plastic frame and a connector are mounted on a printed circuit board and the leadframe elements in the plastic frame couple the battery cells to the connector.

11 Claims, 7 Drawing Sheets

VOLTAGE TAP APPARATUS FOR SERIES CONNECTED CONDUCTIVE CASE BATTERY CELLS

TECHNICAL FIELD

The present invention relates to battery packs including a plurality of series-connected conductive case battery cells, and more particularly to an apparatus for providing both cell voltage sensing and electrical isolation between adjacent cells in the pack.

BACKGROUND OF THE INVENTION

Multi-cell battery packs for high-voltage applications such as hybrid electric vehicles typically comprise a chain of series-connected battery cells arranged in a matrix. A common packaging design has each battery cell housed in a conductive cylindrical case that serves as the negative terminal of the cell, with dielectric spacers that ensure electrical isolation between adjacent cells of the battery pack. In battery packs where the voltage of each cell is monitored for control purposes, voltage taps are used to electrically access the end terminals and each cell-to-cell connection in the pack. In battery packs containing many cells, the numerous voltage taps create wire routing and error-proofing issues that are difficult to adequately address in a manufacturing facility. Accordingly, what is needed is an improved way of providing the required voltage taps.

SUMMARY OF THE INVENTION

The present invention is directed to an apparatus that functions as both a voltage tap and a cell isolator for conductive case battery cells that are joined end-to-end in a series chain. The apparatus includes conductive leadframe elements partially encased in a plastic frame that engages the joined cells about their juncture, with portions of the lead-frame elements exposed to electrically contact the conductive cases of the cells. In a first embodiment, the plastic frame is in the form of a hinged clamp that closes about the juncture of the joined cells, and the lead-frame elements are routed to terminals formed on one end of the frame. The terminals can be mated to connectors, or a printed circuit board can be used to interface a larger connector to the terminals of two or more plastic frames. In a second embodiment, the plastic frame is in the form of an elongate strip mounted on a printed circuit board. The frame incorporates nesting features for locating the joined battery cells, and the lead-frame elements electrically couple the cell cases to a connector mounted on one end of the circuit board.

BRIEF DESCRIPTION OF THE DRAWINGS

FIG. 4 is an isometric view of a modified version of apparatus of FIG. 2 installed on a serial array of battery pack modules, with a circuit board coupling each apparatus to a common connector;

DESCRIPTION OF THE PREFERRED EMBODIMENT

In general, the present invention is directed to an apparatus for electrically accessing the individual cells of a battery pack for voltage monitoring while also providing electrical insulation between adjacent cells of the pack. In particular, the apparatus of the invention is directed to battery packs comprising conductive case cells that are joined end-to-end.

Figure 1:
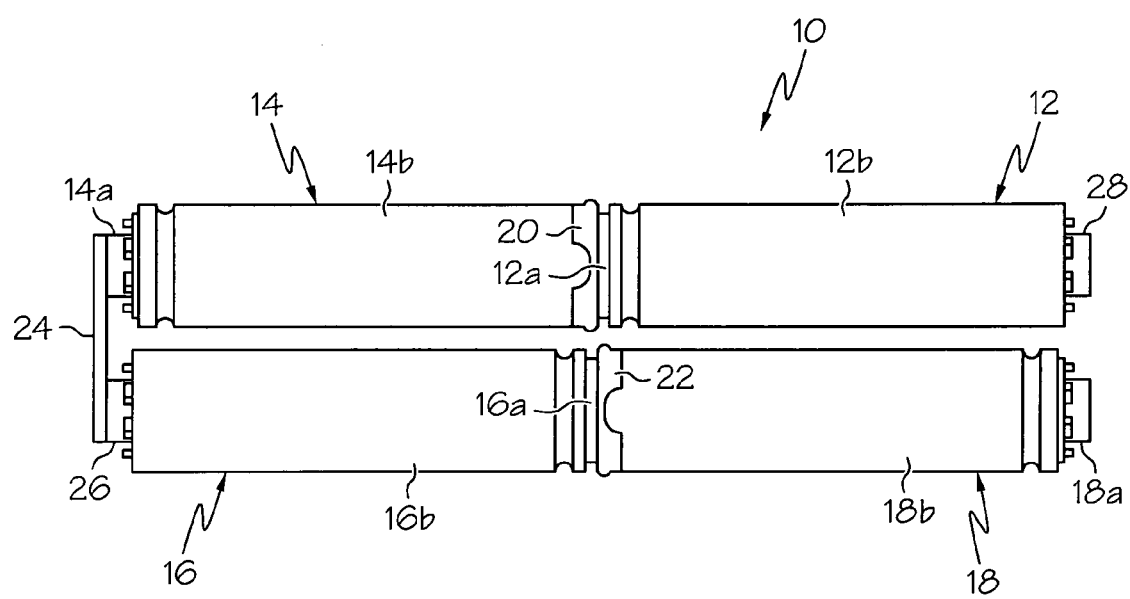
FIG. 1 is a side view of a battery module including two pairs of battery cells joined end-to-end and connected in series.

For purposes of illustration, FIG. 1 depicts a battery pack module 10 comprising four conductive case cells 12, 14, 16, 18. The cells 12 and 14 are joined end-to-end, as are the cells 16 and 18. End-to-end joining of cells in each instance is accomplished with a cup-shaped interconnect 20, 22 that is welded to the respective cells. For example, interconnect 20 is welded both to the positive terminal 12a of cell 12 and to the case 14b (i.e., the negative terminal) of cell 14; and interconnect 22 is welded both to the positive terminal 16a of cell 16 and to the case 18b (i.e., the negative terminal) of cell 18. The bus bar 24 joins the positive terminal 14a of cell 14 to a welding ring 26 fastened to the exposed end of cell 18, connecting the cell pair 12/14 in series with the cell pair 16/18. The positive terminal 18a of cell 18 forms the positive terminal of the module 10, and a welding ring 28 fastened to the exposed end of cell 12 forms the negative terminal of the module 10.

Ordinarily, individual cell voltage monitoring is achieved by placing voltage taps on the battery pack terminals 18a and 28, on bus bar 24, and on each interconnect 20, 22. The wires from these voltage taps are collected in a bundle or harness and ultimately connected to a voltage monitoring circuit. In large battery packs containing many cells, this can create wire routing and error-proofing issues that are difficult to adequately address in a manufacturing facility.

Figure 2:
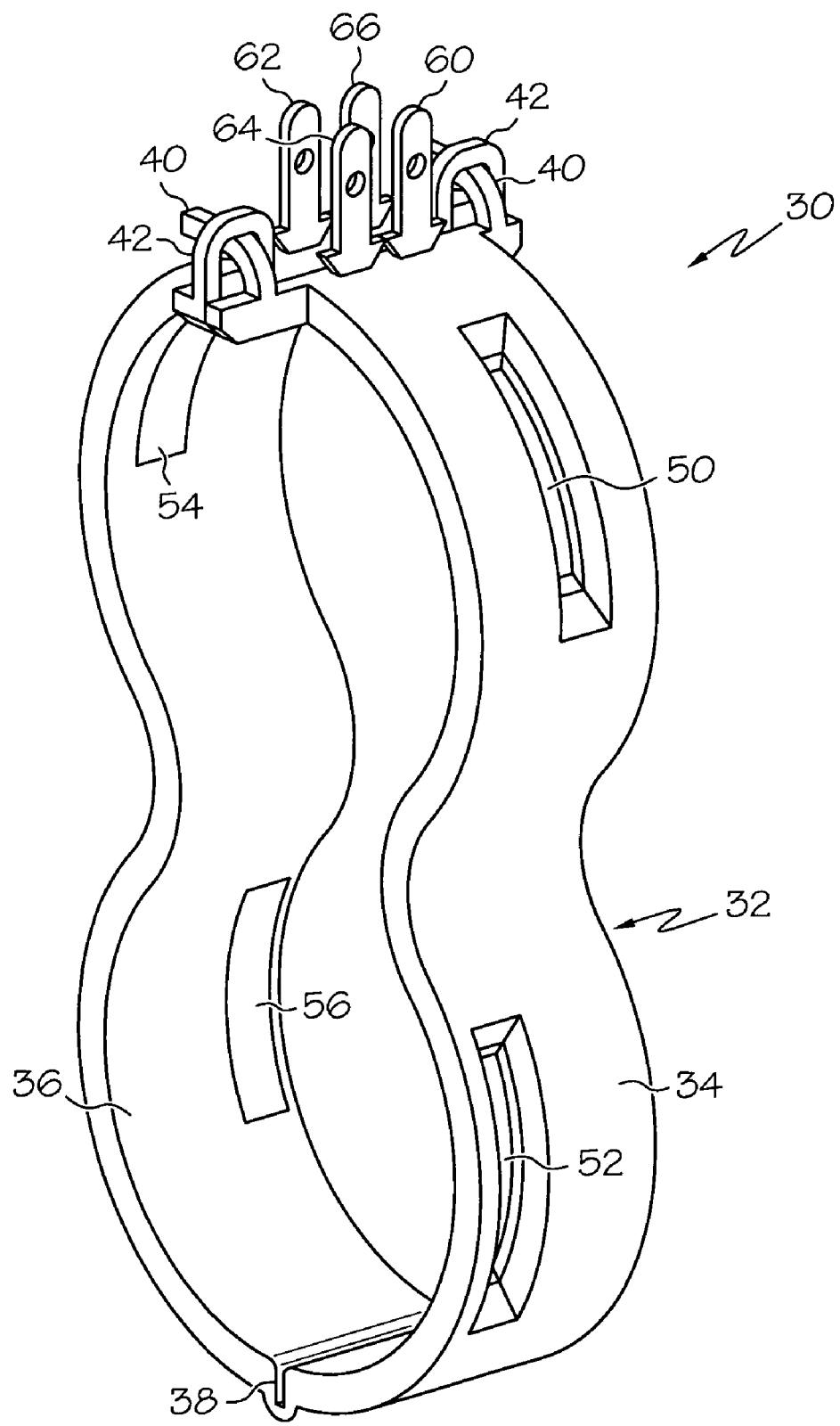
FIG. 2 is an isometric view of a voltage tap apparatus according to a first embodiment of the present invention.
Figure 3:
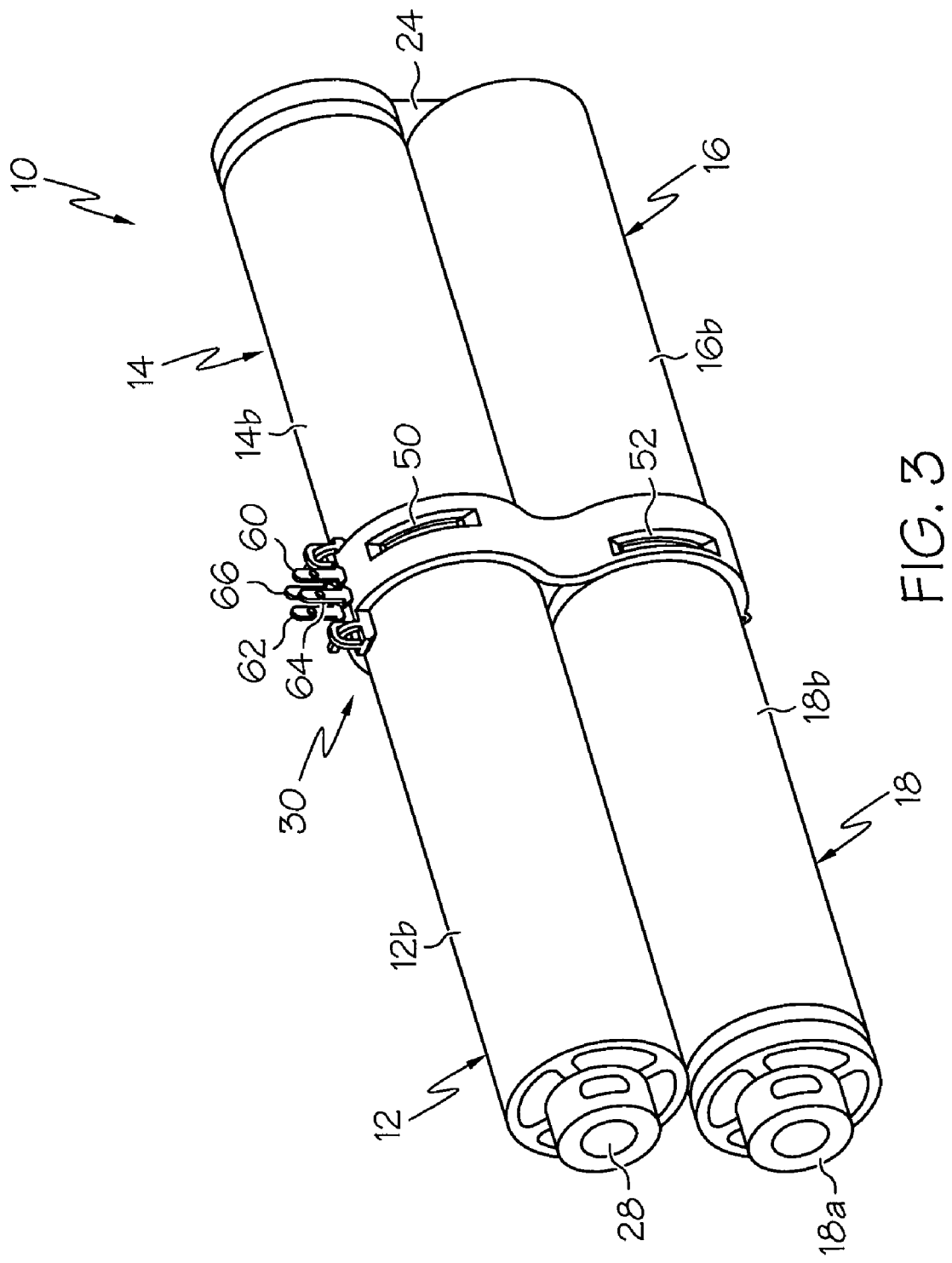
FIG. 3 is an isometric view of the apparatus of FIG. 2 installed on the battery pack module of FIG. 1.
Figure 4:
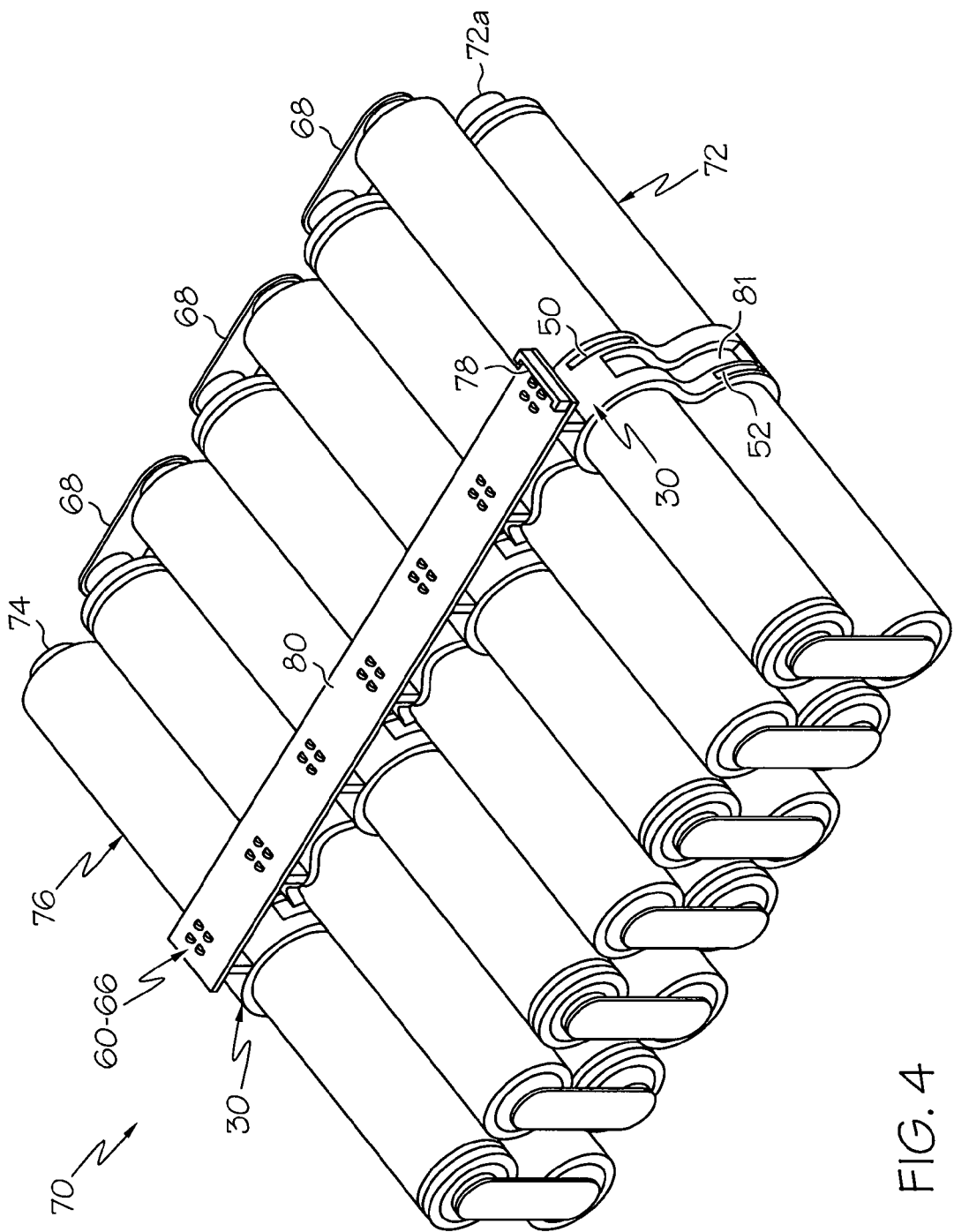
FIG. 4 is an isometric view of a modified version of the apparatus of FIG. 1 installed on a battery pack.
Figure 5:
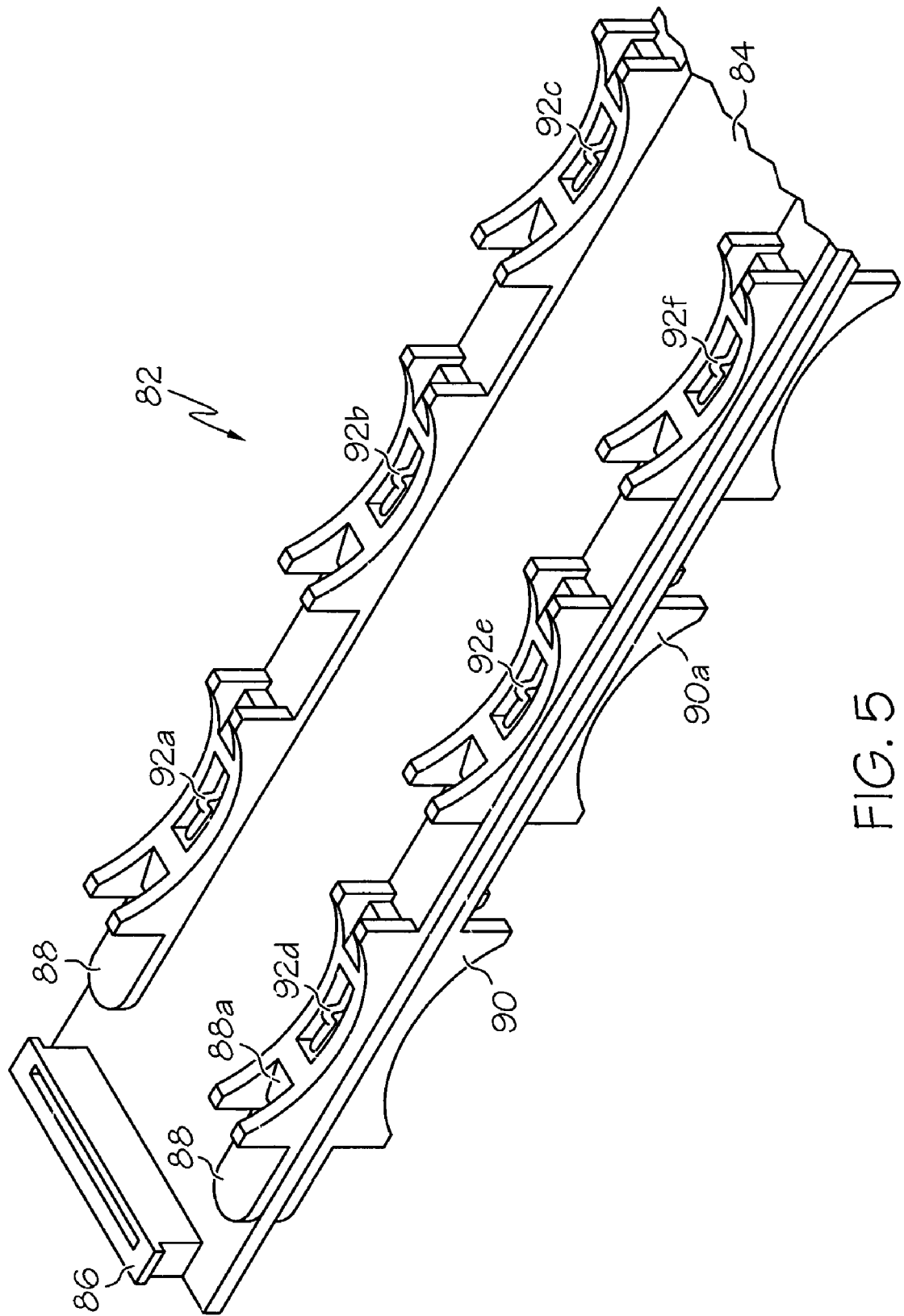
FIG. 5 is an isometric view of a voltage tap apparatus according to a second embodiment of the present invention.
Figure 6:
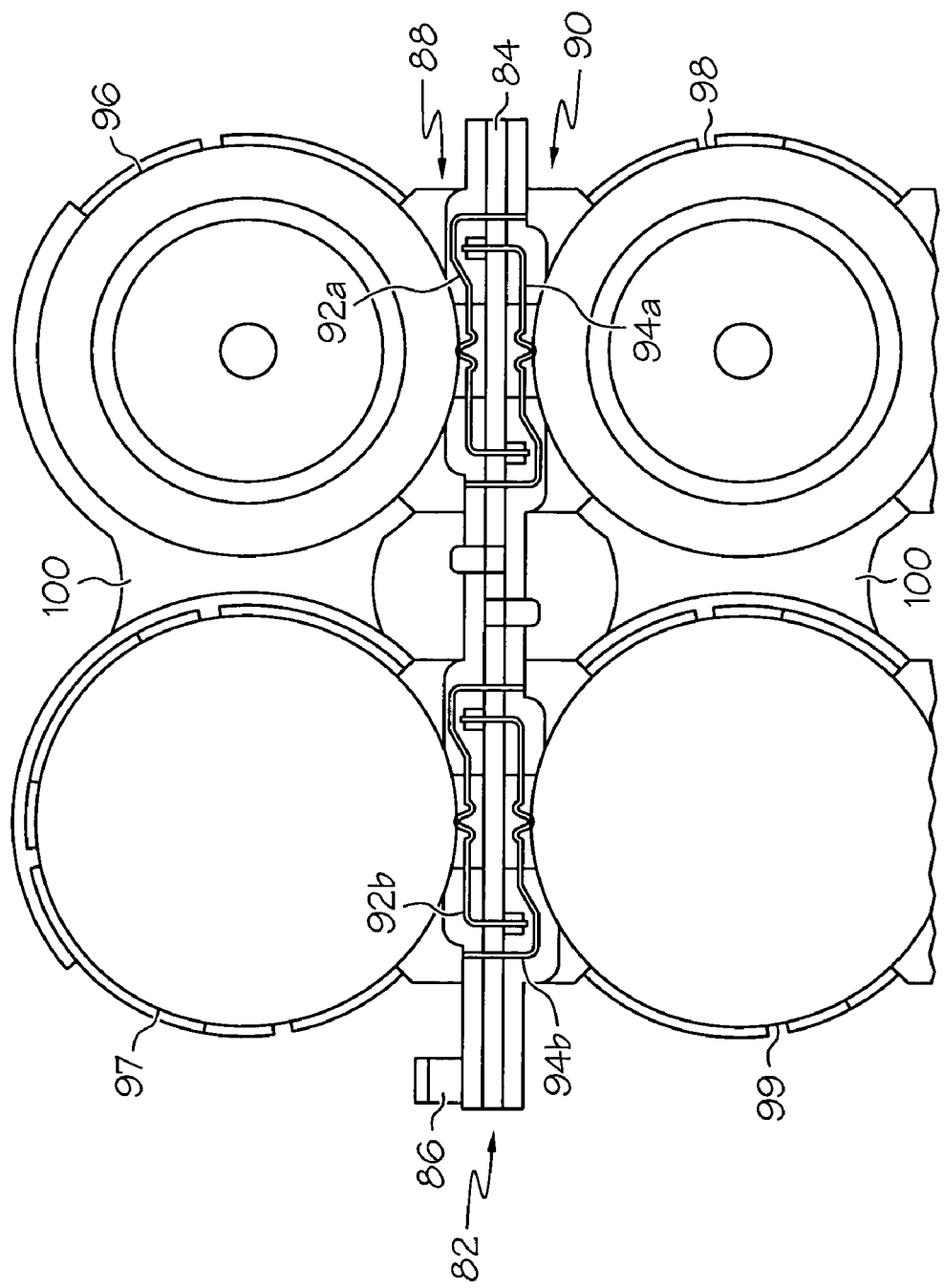
FIG. 6 is a partial cross-sectional view of the apparatus of FIG. 5 applied to a serial array of battery pack modules.
Figure 7:
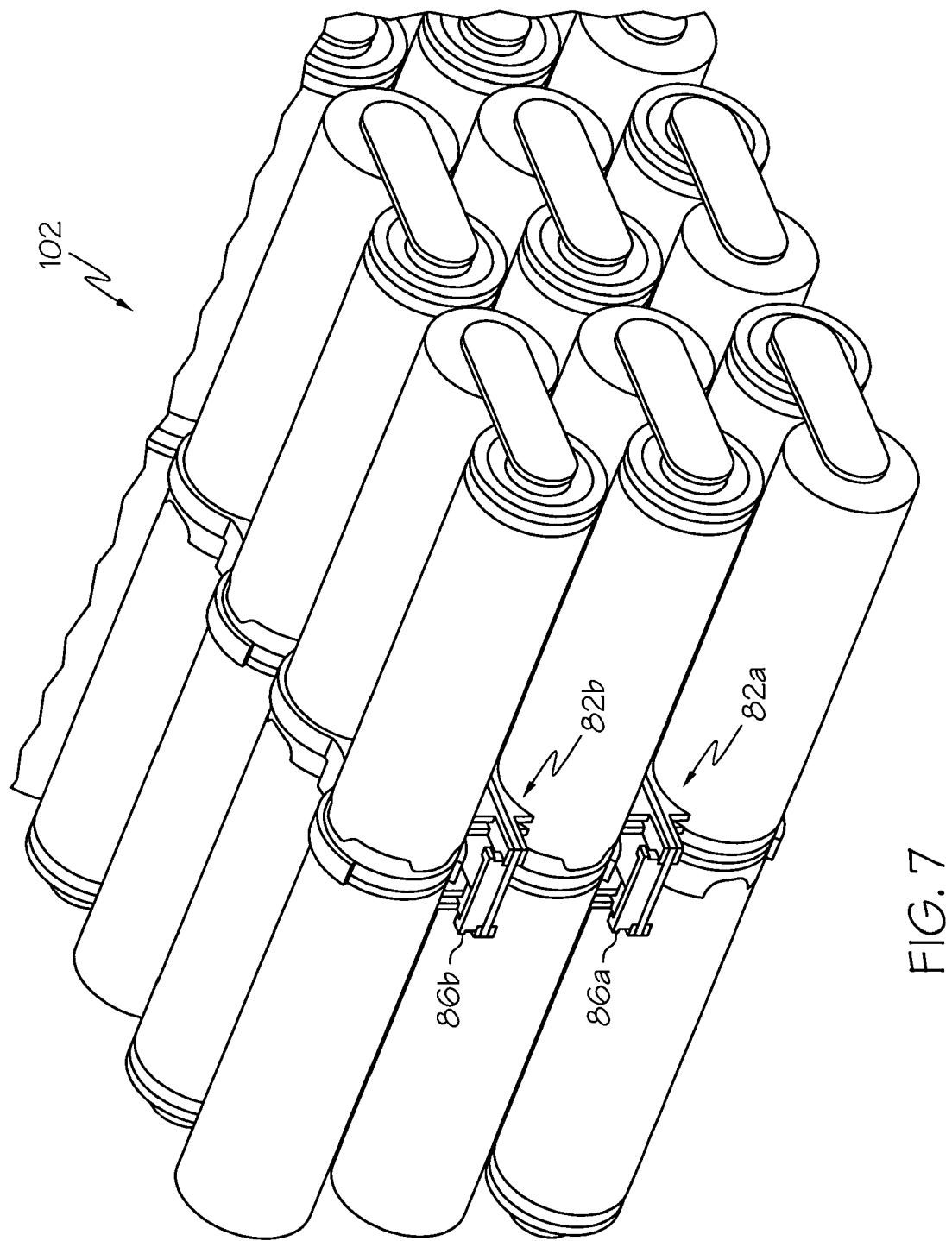
FIG. 7. is an isometric view of the apparatus of FIG. 5 applied to a matrix of battery cells.

In general, the present invention addresses the above-described problem with an improved voltage tap apparatus including conductive lead-frame elements partially encased in a plastic frame that engages battery cells that are joined end-to-end, with portions of the lead-frame elements exposed to electrically contact the cases of the joined cells. FIGS. 2-4 illustrate a first embodiment in which the plastic frame is in the form of a hinged clamp that closes about the juncture of the cells, and FIGS. 5-7 illustrate a second embodiment in which the plastic frame is in the form of an elongate strip mounted on a printed circuit board, with nesting features integrated into the frame for supporting the joined cells at their juncture.

Referring to FIG. 2, the reference numeral 30 generally designates a voltage tap apparatus according to the first embodiment of this invention. The plastic body 32 of the apparatus 30 is molded in one piece, including first and second legs 34 and 36 joined by a notched portion 38 that forms a living hinge. The free ends of the legs 34 and 36 are formed with locking tab and slot features 40 and 42 so that the legs 34 and 36 may be locked in a closed position as illustrated in FIG. 2. The legs 34 and 36 are oppositely convoluted to close around four battery cells as shown in FIG. 3. When so installed, the apparatus 30 supports and electrically isolates the clamped battery cells from each other and from adjacent cells of the battery pack. Of course, the apparatus 30 could be extended to close around a smaller or larger number of battery cells, if desired.

The voltage tap functionality of apparatus 30 is provided by first and second pairs of conductive leadframe elements 50, 52 and 54, 56 insert molded in the first and second legs 34, 36. The leadframe elements 50, 52 and 54, 56 protrude from interior surface of the legs 34, 36 as illustrated in FIG. 2 for leadframe elements 54, 56 and second leg 36 to form resilient electrical contacts that engage the periphery of the clamped battery cells. And an end portion of each leadframe element 50-56 protrudes from the plastic body 32 near the free ends of legs 34-36 to form a set of four electrical terminals 60, 62, 64, 66.

FIG. 3 shows the apparatus 30 applied to the cells 12-18 of battery pack module 10. The apparatus 30 is positioned at the juncture of the end-to-end joined battery cells 12/14 and 16/18 so that the leadframe elements 50-56 each contact a different battery cell. Specifically, the leadframe elements 50, 52, 54, 56 respectively contact the cases 12b, 14b, 16, 18b of cells 12, 14, 16, 18. The voltage of cell 12 is indicated by the potential difference between the leadframe elements 50 and 54 (terminals 60 and 62); the voltage of cell 14 is indicated by the potential difference between the leadframe elements 50 and 56 (terminals 60 and 66); and the voltage of cell 16 is indicated by the potential difference between the leadframe elements 56 and 52 (terminals 66 and 64). The voltage of cell 18 is indicated by the potential difference between the leadframe element 52 (terminal 64) and the positive terminal 18a of module 10. Thus, the terminals 60-66, along with the positive terminal 18a of the battery pack module 10, provide voltage tap access to all four of the battery cells 12-18. Of course, in larger battery packs where two or more of the battery pack modules 10 are connected in series as shown in FIG. 4, the positive terminal 18a will be electrically accessible by a leadframe element of an adjacent voltage tap apparatus 30.

Of course, battery packs usually include many more cells than the four cells of module 10, and a several such modules can be arranged in a row and interconnected with conductive straps 68 to form a larger pack 70 of series connected cells as illustrated in FIG. 4. In the arrangement of FIG. 4, for example, the positive terminal 72a of cell 72 forms the positive terminal of the battery pack 70, and a welding ring 74 fastened to the exposed end of cell 76 forms the negative terminal of the battery pack 70. Each module of the pack 70 is provided with a voltage tap apparatus 30 so that the terminals 60-66 extend in the same direction for ease of accessibility. Individual connectors can be mated to each set of four terminals 60-66, but a preferred arrangement including a single connector 78 and a printed circuit board 80 is shown in FIG. 4. The printed circuit board 80 is in the form of an elongate strip, with the connector 78 attached to one end, and conductor traces (not shown) formed on or in the circuit board 80 couple the pins of connector 78 to the terminals 60-66 of each voltage tap apparatus. The terminals 60-66 can be spade-type terminals that extend through openings formed in the circuit board 80 for wave soldering, or compliant-type terminals that extend through plated holes formed in the circuit board 80 for a solderless connection. Finally, it will be noted that the voltage tap apparatuses 30 depicted in FIG. 4 have been modified to allow closer spacing between adjacent modules. The modification is a cutout 81 between the leadframe elements 50, 52 and 54, 56 in each leg 34, 36 of the apparatus 30 that allows the legs of adjacent voltage apparatuses 30 to interleave as shown.

Referring to FIGS. 5-7, the reference numeral 82 generally designates a voltage tap apparatus according to the second embodiment of this invention. The apparatus 82 includes a printed circuit board 84, an electrical connector 86 mounted on one end of the printed circuit board 84, and molded plastic legs 88, 90 mounted on opposing faces of the circuit board 84. In the illustrated embodiment, the legs 88 and 90 each comprise two parallel segments, but could obviously be formed as a single part. The molded plastic legs 88 and 90 have concave nesting features 88a, 90a for supporting end-to-end joined battery cells, and insert molded leadframe elements for electrically coupling the battery cell cases to the pins of connector 86 via circuit board conductor traces. In the view of FIG. 5, the leadframe elements 92a, 92b, 92c, 92d, 92e and 92f of the molded plastic leg 88 are visible, but the leadframe elements 94 of molded plastic leg 90 are hidden.

As with the apparatus 30 of FIGS. 2-4, the apparatus 82 is positioned at the juncture of end-to-end joined battery cells so that the leadframe elements 92, 94 each contact a different battery cell. Referring to FIG. 6, for example, the leadframe element 92a contacts the case of battery cell 96, the leadframe element 92b contacts the case of battery cell 97, the leadframe element 94a contacts the case of battery cell 98, the leadframe element 94b contacts the case of battery cell 99. FIG. 6 also shows plastic cell separators 100 for laterally supporting the cell junctions.

Finally, FIG. 7 illustrates the voltage tap apparatus 82 as applied to a larger battery pack 102 comprising a three-layer stack of end-to-end joined battery cells. In this arrangement, a first voltage tap apparatus 82a is placed between the bottom and middle layers of cells, and a second voltage tap apparatus 82b is placed between the middle and top layers of cells. The two connectors 86a and 86b mounted on the ends of the circuit boards 78a and 78b provide electrical access to all of the battery pack cells for voltage monitoring.

In summary, the voltage tap apparatuses of the present invention provide a reliable and practical way of individually accessing the cells of a multi-cell battery pack for voltage monitoring while electrically isolating adjacent cells in the pack. It will be appreciated that the apparatuses 30 and 82 may be modified in length and number of leadframe elements to accommodate various battery cell arrangements. Numerous other modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. Voltage tap apparatus for a battery pack including at least first and second battery cells joined end-to-end in a series chain, where said battery cells each having a conductive case that serves as a cell electrode, the apparatus comprising:

a plastic frame engaging the first and second battery cells about their juncture;

a first conductive leadframe element partially encased in said plastic frame, including an exposed portion electrically contacting the conductive case of said first battery cell and a terminal portion protruding out of said plastic frame for electrically accessing the cell electrode of said first battery cell; and a second conductive leadframe element partially encased in said plastic frame, including an exposed portion electrically contacting the conductive case of said second battery cell and a terminal portion protruding out of said plastic frame for electrically accessing the cell electrode of said second battery cell.

2. The voltage tap apparatus of claim 1, where:
said plastic frame includes first and second legs joined by a living hinge that allows said first and second legs to open for receiving the joined battery cells and to close for clamping around the conductive cases of the joined battery cells.

3. The voltage tap apparatus of claim 2, where:
the first and second legs of said plastic frame include locking features that interlock when said legs close to clamp around the conductive cases of the joined battery cells.

4. The voltage tap apparatus of claim 2, where:
the first and second legs of said plastic frame are oppositely convoluted to receive and clamp around the conductive cases of multiple sets of joined battery cells.

5. The voltage tap apparatus of claim 2, where:
the battery pack includes multiple sets of the joined battery cells connected in a series chain and engaged by respective plastic frames such that the terminal portions of the respective leadframe elements are linearly aligned.

6. The voltage tap apparatus of claim 5, further comprising:
a linearly extending circuit board receiving the linearly aligned leadframe element terminal portions; and
an electrical connector mounted on said circuit board and having connector pins that are electrically coupled to the terminal portions received by said circuit board so that the connector pins of said electrical connector electrically access the cell electrodes of the multiple sets of the joined battery cells.

7. The voltage tap apparatus of claim 1, further comprising:
a circuit board for receiving the terminal portions of said leadframe elements; and
an electrical connector mounted on said circuit board and having connector pins that are electrically coupled to the terminal portions received by said circuit board so that the connector pins of said electrical connector electrically access the cell electrodes of the joined battery cells.

8. The voltage tap apparatus of claim 1, where:
said plastic frame includes nesting features that engage and locate the joined battery cells.

9. The voltage tap apparatus of claim 1, further comprising:
a circuit board having first and second faces, where a first plastic frame is mounted on said first face and a second plastic frame is mounted on said second face; and
where the terminal portions of the leadframe elements of said first and second plastic frames are received in said circuit board.

10. The voltage tap apparatus of claim 9, further comprising:
an electrical connector mounted on said circuit board and having connector pins that are electrically coupled to the terminal portions received in said circuit board so that the connector pins of said electrical connector electrically access the cell electrodes of the joined battery cells.

11. Voltage tap apparatus for a battery pack including first and second pairs of battery cells connected in a serpentine chain, the battery cells of each pair being joined end-to-end, where said battery cells each having a conductive case that serves as a cell electrode, the apparatus comprising:
a plastic frame engaging the battery cells of said first and second pairs about their juncture;
first and second conductive leadframe elements partially encased in said plastic frame, including exposed portions electrically contacting the conductive cases of said first pair of battery cells and terminal portions protruding out of said plastic frame for electrically accessing the cell electrodes of said first pair of battery cells; and
third and fourth conductive leadframe elements partially encased in said plastic frame, including exposed portions electrically contacting the conductive cases of said second pair of battery cells and terminal portions protruding out of said plastic frame for electrically accessing the cell electrodes of said second pair of battery cells.

* * * * *